(12) United States Patent
Weeks et al.

(10) Patent No.: US 7,202,949 B2
(45) Date of Patent: Apr. 10, 2007

(54) BINOCULAR SPECTROMETER

(75) Inventors: Erin M. Weeks, Allston, MA (US);
Kenneth Brecher, Belmont, MA (US)

(73) Assignee: The Trustees of Boston University, Boston, MA (US)

( * ) Notice: Subject to any disclaimer, the term of this patent is extended or adjusted under 35 U.S.C. 154(b) by 399 days.

(21) Appl. No.: 10/954,388

(22) Filed: Sep. 30, 2004

(65) Prior Publication Data

US 2005/0110995 A1    May 26, 2005

Related U.S. Application Data

(60) Provisional application No. 60/507,314, filed on Sep. 30, 2003.

(51) Int. Cl.
*G01J 3/28* (2006.01)
*G01J 3/42* (2006.01)
*G01J 3/427* (2006.01)

(52) U.S. Cl. ........................ 356/328; 356/319

(58) Field of Classification Search ......... 356/300–334
See application file for complete search history.

(56) References Cited

U.S. PATENT DOCUMENTS

| | | | | |
|---|---|---|---|---|
| 2,940,355 A | * | 6/1960 | Cary | 356/301 |
| 3,744,391 A | * | 7/1973 | Plummer | 396/152 |
| 5,297,555 A | * | 3/1994 | Martens | 600/476 |
| 6,045,227 A | * | 4/2000 | Stewart et al. | 351/237 |

* cited by examiner

*Primary Examiner*—Layla G. Lauchman
*Assistant Examiner*—Jarreas C. Underwood
(74) *Attorney, Agent, or Firm*—Weingarten, Schurgin, Gagnebin & Lebovici LLP

(57) ABSTRACT

A direct-view handheld binocular spectrometer for use in a variety of educational settings. The device comprises a holographic transmission diffraction grating and a uniquely curved quantitative wavelength scale for viewing visible-wavelength spectra with both eyes simultaneously. A variable width entrance slit, adjustable illumination for the wavelength scale, and attachable corrective lenses enhance the ease of use and efficiency as compared to traditional monocular spectrometers.

11 Claims, 6 Drawing Sheets

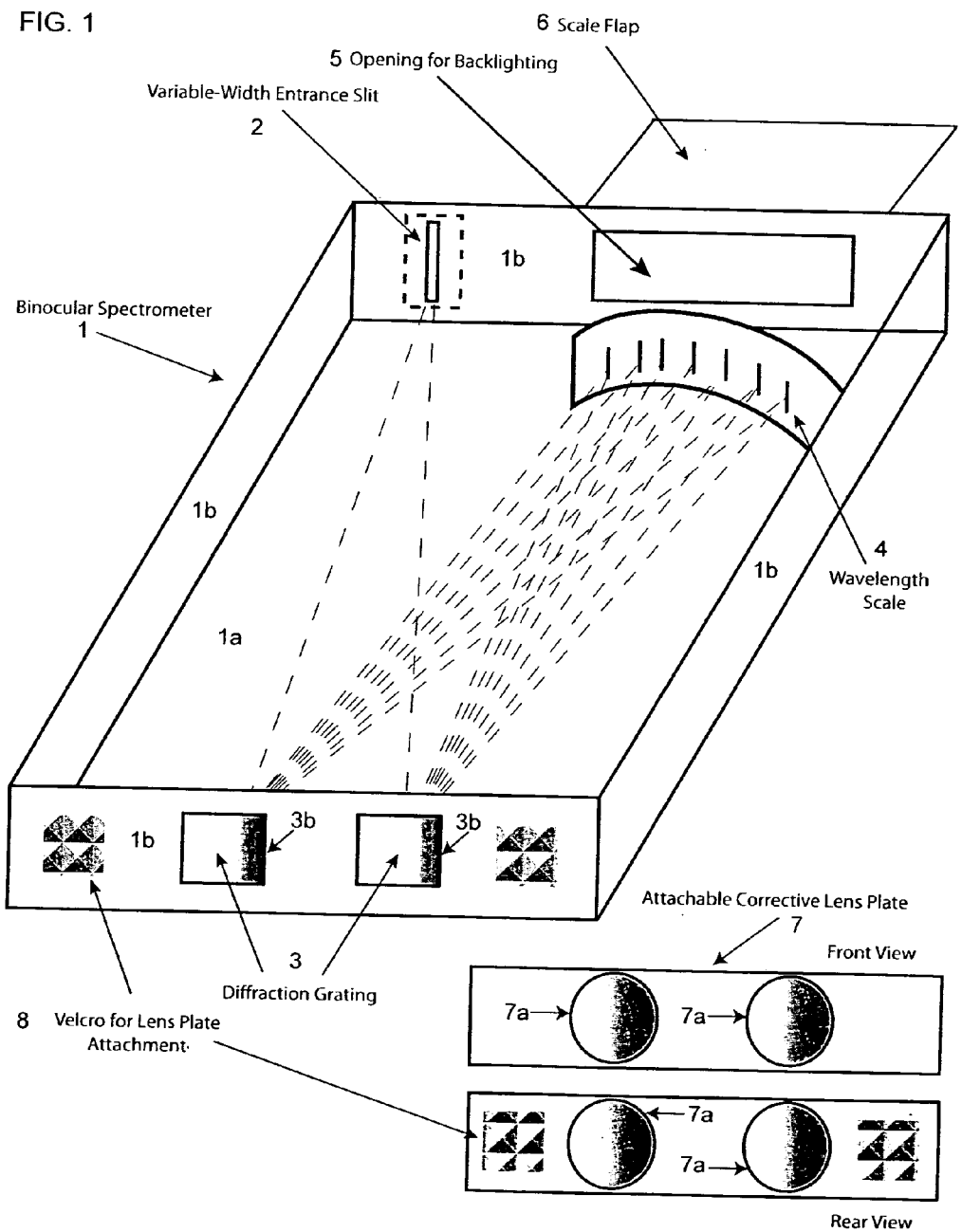

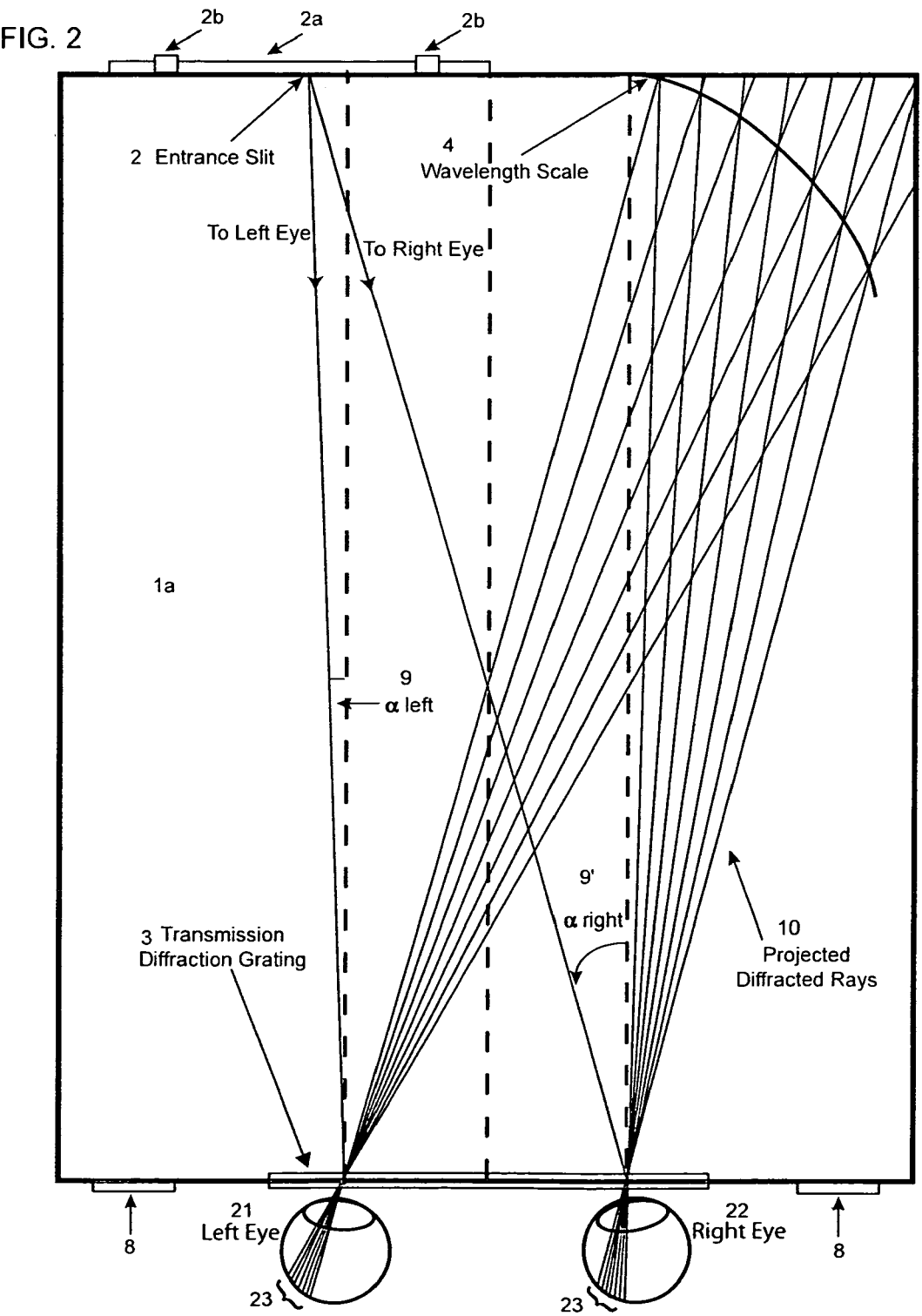

FIG. 3A
FIG. 3B
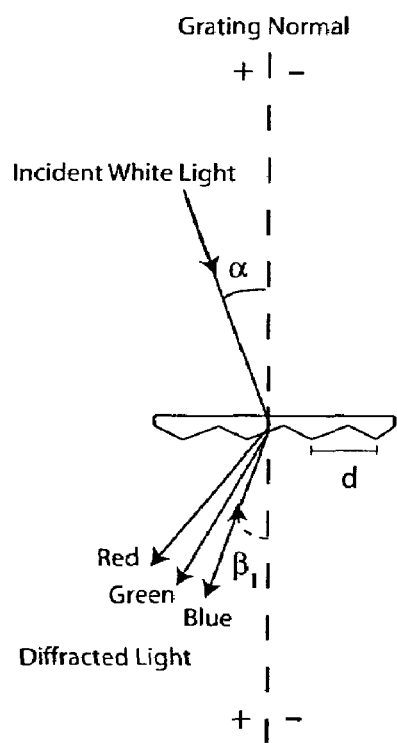
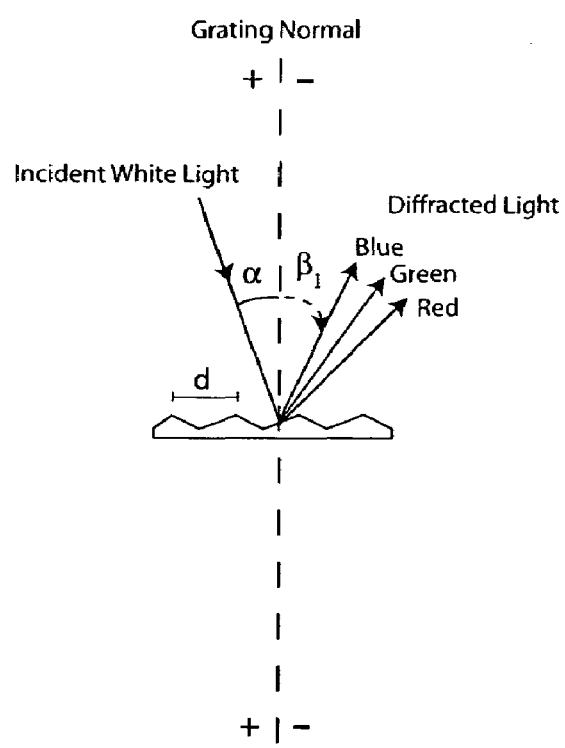
A transmission grating: the incident and diffracted rays lie on opposite sides of the grating
A reflection grating: the incident and diffracted rays lie on the same side of the grating Rear view of spectrometer depicting variable-width entance slit by way of sliding plate with multiple fixed-width slits Rear view of spectrometer depicting variable-width entance slit by way of dual sliding plates that progressively narrow entrance slit while maintaining center position

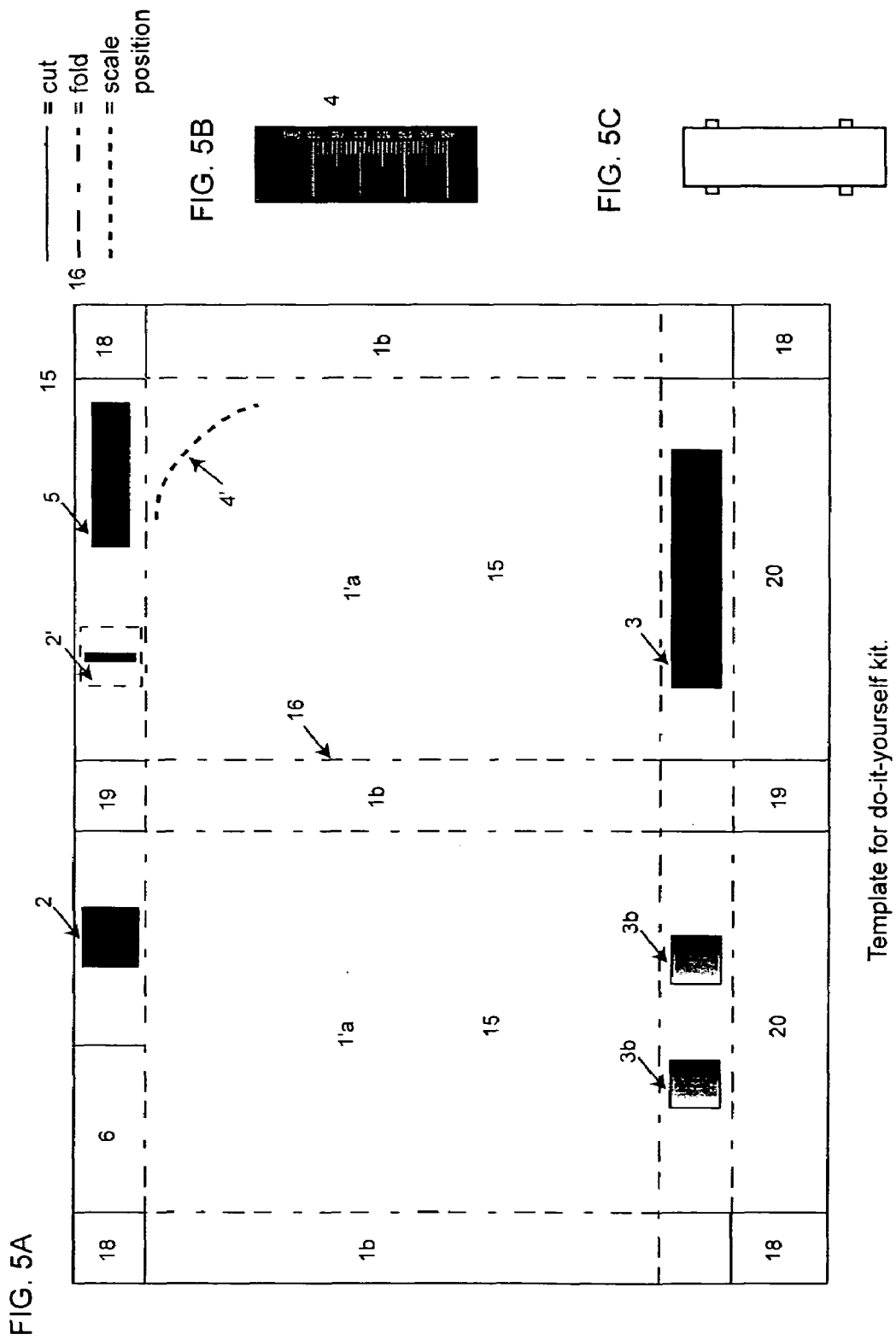

FIG. 6A
FIG. 6B
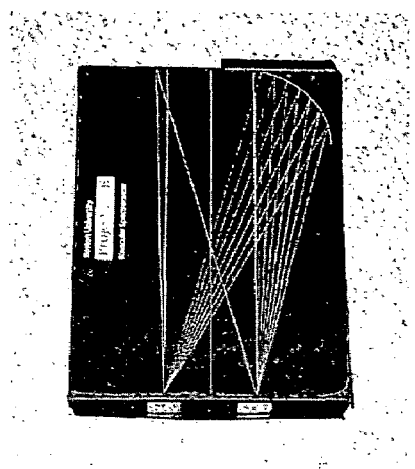
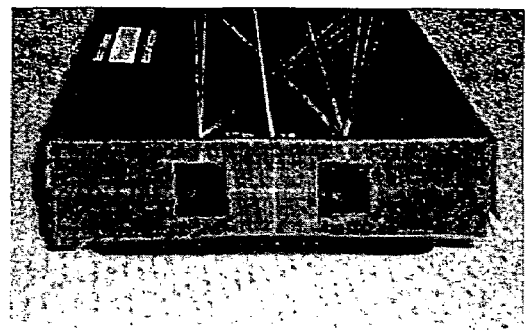
FIG. 6C
FIG. 6D
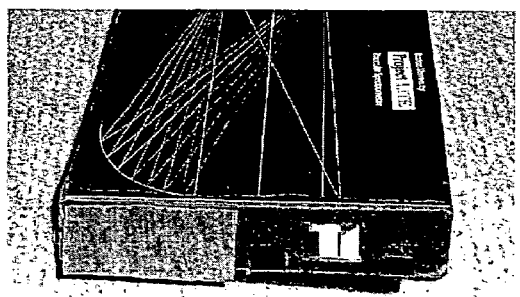
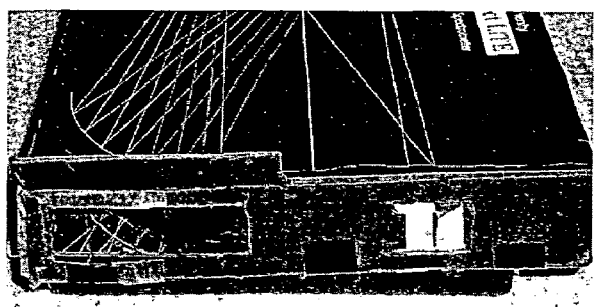
Photographs of prototype binocular spectrometer

BINOCULAR SPECTROMETER

CROSS REFERENCE TO RELATED APPLICATIONS

This application claims priority to Provisional Application No. 60/507,314 filed Sep. 30, 2003.

FIELD OF THE INVENTION

This invention relates to a direct-view binocular spectrometer for observing optical spectra simultaneously with both of the viewer's eyes. The preferred embodiment includes a holographic transmission diffraction grating and a uniquely curved wavelength scale.

BACKGROUND OF THE INVENTION

A spectrometer is an analytical instrument used for dispersing light into its component wavelengths (or equivalent frequency or energy) by way of a prism or diffraction grating, and measuring that dispersion quantitatively. The spectrometer differs from similar instruments such as the spectroscope and spectrograph mainly in the display and recordation of the spectra: a spectroscope usually refers to a device that displays the dispersed spectrum without quantitative measure and a spectrograph records the spectrum either photographically or electronically using a CCD or similar device. Spectrometers are used in a wide variety of scientific research fields such as astronomy, physics, chemistry, and other disciplines that rely upon spectroscopic analysis to identify materials. Spectrometers are also valuable education tools for teaching students about the interactions between light and matter within these disciplines.

Conventional direct-view spectrometers are monocular in that one uses a single eye to view the spectrum. Nearly all such devices are similar in design and overall structure, varying only slightly in size, shape, and spectral resolution. The geometry of monocular spectrometers requires the user to squint, which leads to significant discomfort. Alignment of these devices is also difficult, particularly on narrow light sources, since angled geometries and fixed entrance-slit widths are prevalent. A further limitation to efficient and comfortable use is insufficient illumination of the wavelength scale when the devices are used to make quantitative measurements. Because many laboratory light sources are both physically narrow in size and dim in brightness, and measurements are taken in a darkened environment, it is most often difficult to accurately read off measurements from standard existing monocular spectrometers.

Prior to the present invention no binocular spectrometer in which the same image of a spectrum is viewed simultaneously by both eyes has been devised. In order to view a single image with both eyes at a near distance, one must compensate for binocular disparity by placing the wavelength scale on a properly shaped surface at a distance such that the diffracted rays seen by each eye converge for all wavelengths. A geometry supporting binocular viewing also allows for a more comfortable ergonomic design. In addition to an increase in user comfort, binocular viewing is known to improve sensitivity to differences in contrast, resolution, and color as, for example, in binocular microscopes.

SUMMARY OF THE INVENTION

It is an object of the present invention to provide an educational-grade direct-view binocular spectrometer.

It is another object of the present invention to provide a binocular spectrometer producing spectra to be directly viewed simultaneously by both of the viewer's eyes.

It is another object of the present invention to provide a handheld spectrometer with improved efficiency and ease of use over traditional monocular devices.

These and other features are attained according to the present invention by providing a binocular spectrometer which allows for comfortable, efficient viewing of spectra with both eyes simultaneously. The spectrometer comprises a holographic transmission grating of modest dispersion, which produces a clearly visible, in-focus spectrum on a uniquely curved wavelength scale. A variable-width entrance slit allows the user to control the amount of light entering the instrument while also providing easy alignment on even the narrowest of sources. A flap over the calibrated scale allows the user to adjust backlighting on the scale. An attachable corrective lens plate allows the user to customize the focus for his/her personal preference.

BRIEF DESCRIPTION OF THE DRAWINGS

The advantages of the present invention will become more apparent upon consideration of the following detailed disclosure of the invention along with the accompanying drawings, in which:

FIG. 1 is a perspective view of the binocular spectrometer according to the present invention in which the light-tight outer housing is depicted with the top removed.

FIG. 2 is a top plan cross-sectional view of the interior of the device in its preferred embodiment. The ray diagram traces out the path of the light as seen by both eyes of the user.

FIG. 3 is a diagram depicting the differences between transmission and reflection diffraction gratings.

FIG. 5 is a scaled template for home-construction of the invention.

FIG. 6 is a series of photographs of a prototype of the preferred embodiment of the invention.

DESCRIPTION OF THE PREFERRED EMBODIMENT

Figure 4A:
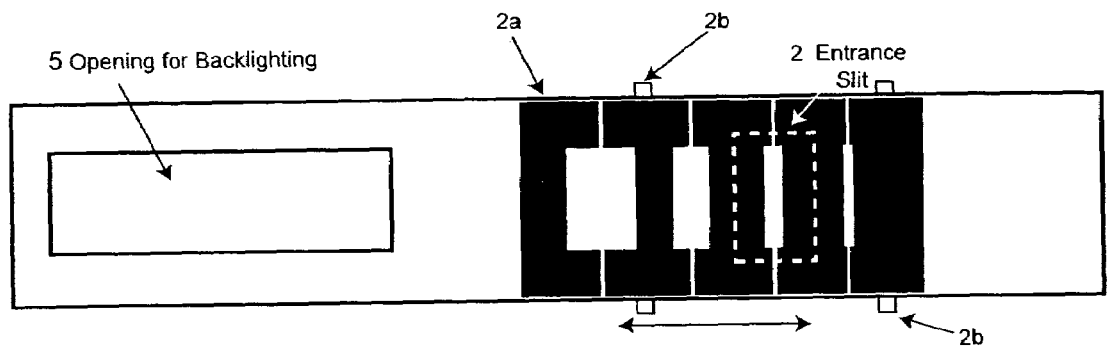
FIG. 4 is a drawing of two possible mechanisms for a variable-width entrance slit.

As shown in FIG. 1, the binocular spectrometer of the invention comprises a frame 1 consisting of a bottom member 1a and side members 1b. A cover corresponding to bottom member 1a may also be provided as discussed herein below. The construction of the frame 1 may be of a fold-up sheet material provided in a kit or any inexpensively formed plastic or similar material. The binocular spectrometer of the invention includes a variable width entrance slit 2 on the rear panel 1b and comprises an aperture 2 over which, with reference to FIG. 2, a sliding plate 2a is allowed to move over the entrance slit 2, exposing apertures of different size as shown in FIG. 4.

Returning to FIGS. 1 and 2 light coming through the entrance slit 2, from a light source under investigation, is perceived by observer's eyes 21 and 22 through a holographic transmission diffraction grating 3. Two apertures 3b are placed in the front side wall 1b to correspond to conventional eye positions, and are sufficiently broad to accommodate a range of common eye separations. The effect of the diffraction grating 3, using criteria for its construction as disclosed herein after, is to spread the light from the slit 2 into a spectral range which is focused onto the retina of the eyes 21 and 22 over a spectral range 23. The observer through eyes 21 and 22 also sees against the far side wall 1b a wavelength scale 4, which may be variably illuminated through an opening 5 for back lighting with a foldable flap 6, or with a small auxiliary light, to present scale indicia corresponding to the manner in which the grating 3 spreads the light.

To accommodate eyes with difficulty focusing at short distances, a set of Velcro attachments 8 are provided on the front face 1b and corresponding Velcro on a set of attachable corrective lens plates 7. These have corrective lenses 7a to accommodate a range of focal lengths. In operation the eyes 21 and 22 see the spectral dispersions 23 against the wavelength scale 4 illuminated with light through the opening 5. Along projected extensions of the spectrum 23 as virtual projected diffracted rays 10. These form angles 9 and 9' respectively with the left and right eye. As a result the student sees the spectral lines against the scale 4 and can make an evaluation of the spectral characteristics of the radiation.

By making the diffraction grating a transmission grating the diffracted light appears on the opposite side of the grating from the incident light but also because of its transmissive properties allows the observer on that opposite side to see back through the grating so as to observe the spectral lines upon the scale as noted above. FIG. 3A illustrates this phenomenon in which a transmission grating such as the grating 3 of the present invention spreads the light on the opposite side by an angle β for light incident at an angle α measured from the grating normal. These same angles apply in the case of a reflective grating 3 as shown in FIG. 3B.

Figure 4B:
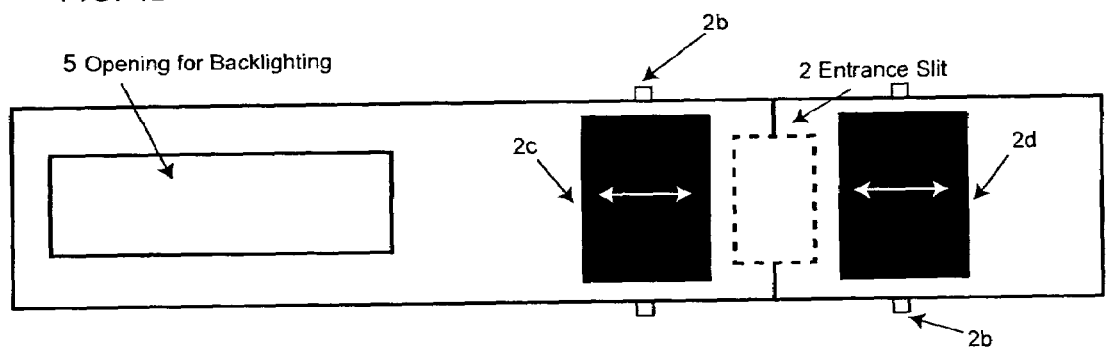

With respect to FIGS. 2 and 4 and 4A, the variations in entrance slit width can be accomplished by the slide 2a, held in place by mountings 2b, or as shown in FIG. 4A by separate slide elements 2c and 2d which can be independently slid across the entrance slit 2 to provide a predetermined width. The value of an adjustable width is to accommodate for light sources of different intensities and physical sizes. A wider slit can allow a greater amount of light from a dim source to enter the instrument to allow for brighter spectra and easier quantitative measurements, while a narrower slit can restrict the amount of light entering the instrument from a bright source which might overpower the spectrum with stray light. Also, a variable-width slit gives the user the ability to use a wide slit to align the instrument on a physically narrow source and subsequently decrease the width of the slit to achieve the best quantitative measurements.

As noted above the spectrometer can be provided for students as a do-it-yourself kit in which the spectrometer can be folded and tabs adhered from a single sheet 15 as shown in FIG. 5. Fold lines 16 are indicated as dashed lines. A separate scale 4 can be provided to go into the scale position marked on the sheet of FIG. 5A at 4'. Corner sections 18 typically will be removed and tabs 19 may be used for adhering portions of the completed element and may be provided with adhesives covered by peel-off non-sticks. The top portion 1'a has an additional side element 1b which can be used to fasten to the right most side panel 1b, again with possible peel expose adhesive. End flaps 20, or one of them, may be used to adhere the top and bottom surfaces together. The aperture 5 will have a flat portion 6 above it when the device is assembled and the slit 2 and opening 2' will align. Separate slit adjusting element 5' can, be provided in the kit or separate from the main sheet, as shown in FIG. 5B.

FIG. 6 illustrates in FIG. 6A a top view of a prototype, FIG. 6B, a user end view. In FIGS. 6C and 6D, the light entrance 5 is shown with the scale flap respectively in a closed or open position over the light entrance aperture 5.

Because the handheld spectrometer is intended to be an educational tool, and not a research-grade instrument, high spectral resolution is not extremely important. High resolution would also greatly raise the cost of materials. As a result the instrument housing 1a, b is of a non-rigid sheet material which may be paper, plasticized paper, plastic, or the like. A holographic transmission grating 3 with a modest grating constant of 750 lines/mm was chosen for the prototype although one could use gratings with line spacing anywhere from 600–900 lines/mm without the overall size of the spectrometer becoming too small or too cumbersome. A single continuous piece of grating material forming the grating 3 is mounted across the front end of the spectrometer to ensure that both eyes view the same diffraction pattern 10 simultaneously. Diffraction of light by a transmission diffraction grating results in the incident and diffracted light rays lying on opposite sides of the grating (See FIG. 3). This property allows the user to look directly through the grating to view a virtual image of the spectrum in projection as shown in FIG. 2.

Various sizes and shapes of the present invention were tested during the design process. Producing both a suitably broad dispersion for quantitative measurements and a minimization of the effects of binocular disparity introduces constraints to the length and width of the spectrometer. Traditional monocular direct-view spectrometers come in a variety of shapes including rectangles, trapezoids, triangles, and tubes. For the present invention, the simplest shape for the prototype instrument 1—a rectangle—was chosen. The symmetry of such a shape lends itself to user comfort and easy construction. Although a smaller overall size of the instrument might be achievable with a different geometry, it was found that for the desired compromise of size and dispersion, the best choice for the prototype 1 was a rectangular box approximately ten and a half inches long by eight inches wide by one and a half inches thick. The chosen size and shape also allows for easy do-it-yourself construction via a template such as the one in FIG. 5.

Slit position is another factor to which considerable thought was given. Many of the existing models tend to put the entrance slit on the right-hand side of the instrument (as seen by the user) so that the light is dispersed with wavelength decreasing from left to right across the wavelength scale. Since the present invention has educational applications and most students learn about the visible spectrum in terms of wavelength, a right-side slit design is counterintuitive and confusing for students. The prototype instrument 1 was therefore designed with the entrance slit 2 on the left in order that the diffracted spectrum increases in wavelength from left to right as seen by the user. Multiple configurations for the exact position of the slit relative to the observer's two eyes were tested, including a center slit and a slit that lies along the normal to the left eye. It was found that the optimal slit position for dispersing the light from left to right in ascending wavelength values and simultaneously maximizing usable space inside the box was a configuration in which the angle of incidence, α, is approximately two degrees from the normal to the left eye 22 and approximately sixteen degrees from the normal to the right eye 23 (see FIG. 2).

Because of the relatively short distance from the users' eyes to the wavelength scale, binocular disparity is an important issue. In its original design, the wavelength scale was placed flat across the back of the spectrometer box. This produced a considerable shift in the apparent position of the spectrum as seen by each of the two eyes. Upon careful construction of a ray diagram (as shown in FIG. 2), it was found that the convergence of the diffracted rays 10 falls on a curved surface so that the scale 4 must therefore also be curved in order for a single image to be perceived coincidentally by both eyes simultaneously. The convergence of these rays is determined by solving the grating equation for each eye simultaneously.

Left eye: $Gm\lambda = \sin \alpha_L + \sin \beta_L$

Right eye: $Gm\lambda = \sin \alpha_R + \sin \beta_R$ where:

G=groove density m=diffraction order (taken to be 1 for this case)

$\lambda$=wavelength of light $\alpha_L$, $\alpha_R$=angle of incident light for left and right eye respectively (measured from the normal to the grating surface)

$\beta_L$, $\beta_R$=angle of diffraction for left and right eye respectively (measured from the normal to the grating surface)

Since G, m, and $\lambda$ are pre-determined, only $\alpha$ needs to be specified. $\alpha_R$ is determined by $\alpha_L$ and the eye separation (which is fixed and equal to approximately 2.625 inches for most adults). The intersection of the diffracted rays is determined by the angles $\beta_L$ and $\beta_R$, which are uniquely determined by the above equations and consequently uniquely determine the positioning and spacing of calibrated markings on the wavelength scale. The resulting shape of the wavelength scale 4 goes as the function cosine squared.

Additional features of the design that enhance its ease of use and uniqueness are the adjustable width slit 2 and removable scale flap 6. While a narrow slit is beneficial for observing bright sources, it can also make aligning the instrument on a narrow source a very difficult task for the novice user. A variable slit gives the user the ability to adjust the width of the entrance slit to suit each individual task. Students will be able to use a wide slit to align the instrument and then adjust it to a narrower width in order to achieve the best results for their quantitative measurements. Two possible mechanisms for varying the slit width are shown in FIG. 4. The first method consists of a sliding plate with multiple fixed slits of progressively narrower widths. The second method employs two sliding plates that close in simultaneously from either side of the central slit opening in order to maintain the fixed center position of the slit and therefore to maintain overall calibration of the instrument.

There is also a flap 6 over the wavelength scale 4, which can be lifted up to allow the user to adjust the backlighting 5 on the scale (See FIG. 1). The background can be fully lit by ambient light or made entirely black for qualitative spectroscopy (this feature is particularly useful for observing narrow absorption lines such as the solar Fraunhofer lines). Other ways to increase the readability of the scale, such as printing it on fluorescent paper or inserting a small LED inside the box to provide additional illumination on the scale are also possible.

An attachable corrective lens plate 7 is also included in the design for users who have difficulty focusing at short distances. Although any number of methods can be used to attach this plate, a simple yet effective technique would be to adhere Velcro tabs to both the back side of the lens plate and the front side of the instrument box on either side of the viewing apertures (see FIG. 1).

Although specific applications, materials, and components have been stated in the above description of the preferred embodiment of the invention, other suitable materials, applications, and components as listed herein may be used with satisfactory results and varying degrees of quality.

The invention claimed is:

1. A spectrometer for student use comprising:
    a housing of a non-rigid material forming a bottom, top, side walls and front and back panels;
    one or more apertures in the front panel and a transmission grating placed thereover allowing operator binocular viewing therethrough into the interior of said housing;
    an entrance slit in the back panel and visible through said one or more apertures;
    a curved wavelength scale within said housing and visible through said one or more apertures, said scale placed to indicate the correct wavelength for spectral lines dispersed by said grating in response to light entering through said slit and falling on said one or more apertures and curved to provide substantially the same spectral line position to each eye.

2. The spectrometer of claim 1 wherein said grating is a holographic diffraction grating.

3. The spectrometer of claim 1 further including means for adjusting a width of said slit.

4. The spectrometer of claim 1 further including means for varying the illumination of said scale.

5. The spectrometer of claim 1 further including one or more sets of corrective viewing lenses in holder means and means for selectively attaching said holder means to said front panel with the lenses in alignment with the one or more apertures.

6. The spectrometer of claim 1 wherein said slit is located to the left of said scale as seen by an operator whereby the spectral lines increase in wavelength from left to right as seen by said operator.

7. A kit for forming the spectrometer of claim 1 comprising a sheet apertured, cut and creased for folding to form from said sheet said bottom, top, side walls and front and back panels, said one or more apertures and said slit.

8. The kit of claim 7 further including elements for forming said grating and scale which may be integral to said sheet or separate.

9. The kit of claim 7 wherein said sheet includes flaps having adhesives for causing said housing to enclose an interior space having said scale therein.

10. The spectrometer of claim 1 wherein said bottom, top, side walls and front and back panels are formed of a material selected from the group consisting of paper, plasticized paper and plastic.

11. A spectrometer for student use comprising:
    a housing of a non-rigid material forming a bottom, top, side walls and front and back panels;
    one or more apertures in the front panel and a transmission holographic diffraction grating placed thereover allowing operator binocular viewing therethrough into the interior of said housing;
    an entrance slit of variable width in the back panel and visible through said one or more apertures;
    a wavelength scale within said housing and visible through said one or more apertures, said scale placed to indicate the correct wavelength for spectral lines created by said grating in response to light entering through said slit and falling on said one or more apertures and curved to provide substantially the same spectral line position to each eye;

means for varying the illumination of said scale;
one or more sets of corrective viewing lenses in holders and means for selectively attaching said holder to said front panel with the lenses in alignment with the one or more apertures;
said slit being located to the left of said scale as seen by an operator whereby the spectral lines increase in wavelength from left to right as seen by said operator.

\* \* \* \* \*